(12) United States Patent
Ferri et al.

(10) Patent No.: US 9,568,816 B2
(45) Date of Patent: Feb. 14, 2017

(54) PROJECTOR WITH OPTICAL CONVERSION MEDIA PUMPED BY LOW ETENDUE SOURCE

(71) Applicant: Texas Instruments Incorporated, Dallas, TX (US)

(72) Inventors: John Marshall Ferri, Allen, TX (US); Sajjad Ali Khan, Cupertino, CA (US); Michael Terry Davis, Richardson, TX (US); Vikrant R. Bhakta, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 87 days.

(21) Appl. No.: 14/543,859

(22) Filed: Nov. 17, 2014

(65) Prior Publication Data

US 2015/0146174 A1  May 28, 2015

Related U.S. Application Data

(60) Provisional application No. 61/908,447, filed on Nov. 25, 2013.

(51) Int. Cl.
*G03B 21/20* (2006.01)
*H04N 9/31* (2006.01)
(Continued)

(52) U.S. Cl.
CPC ........... *G03B 21/204* (2013.01); *G02B 26/008* (2013.01); *G02B 26/105* (2013.01);
(Continued)

(58) Field of Classification Search
CPC .............. G03B 21/204; G03B 21/2033; G03B 21/2066; G03B 21/28; H04N 9/3114; H04N 9/3111; H04N 9/315; H04N 9/3164; H04N 9/3161; F21K 9/56; F21Y 2101/025; F21Y 2101/02
See application file for complete search history.

(56) References Cited

U.S. PATENT DOCUMENTS

| 2002/0118343 A1* | 8/2002 | Lee ........................... G02B 5/04 353/84 |
| 2009/0034284 A1* | 2/2009 | Li ........................... G03B 33/06 362/554 |

(Continued)

*Primary Examiner* — William C Dowling
*Assistant Examiner* — Ryan Howard
(74) *Attorney, Agent, or Firm* — Michael A. Davis, Jr.; Charles A. Brill; Frank D. Cimino

(57) ABSTRACT

A projector system with a single imaging array has a low-etendue light source. The projector system includes a first optical path from the low-etendue light source to a plurality of optical conversion media having a plurality of emission wavelengths to provide display light with wavelengths longer than blue light. The projector system includes a second optical path from the optical conversion media to the imaging array. The projector system has a means of moving an excitation location on the optical conversion media in the first optical path. The projector system may include a blue LED, a diffuser region, or an optical conversion medium with a blue emission wavelength to provide blue display light. Light from the low-etendue light source is prevented from directly impinging on the imaging array.

19 Claims, 6 Drawing Sheets

(51) Int. Cl.
*G02B 26/00* (2006.01)
*G02B 27/48* (2006.01)
*G02B 26/10* (2006.01)
*G02B 27/10* (2006.01)
*G02B 27/14* (2006.01)

(52) U.S. Cl.
CPC ....... *G02B 27/1033* (2013.01); *G02B 27/148* (2013.01); *G02B 27/48* (2013.01); *H04N 9/3161* (2013.01); *G02B 27/141* (2013.01)

(56) References Cited

U.S. PATENT DOCUMENTS

2011/0228230 A1* 9/2011 Inoue .................... H01S 5/0683
　　　　　　　　　　　　　　　　　　　　　　353/31
2012/0133903 A1* 5/2012 Tanaka ............... G03B 21/2013
　　　　　　　　　　　　　　　　　　　　　　353/31

* cited by examiner

PROJECTOR WITH OPTICAL CONVERSION MEDIA PUMPED BY LOW ETENDUE SOURCE

CROSS-REFERENCE TO RELATED APPLICATIONS

This application claims the benefit of priority under U.S.C. §119(e) of U.S. Provisional Application 61/908,447, filed Nov. 25, 2013, which is hereby incorporated by reference in its entirety.

FIELD OF THE INVENTION

This invention relates to the field of projector systems. More particularly, this invention relates to projector systems with imaging arrays.

BACKGROUND OF THE INVENTION

It is desirable to reduce the size of a projector system with a single imaging array, such as a Digital Mirror Device (DMD) or a liquid crystal on silicon (LCOS) array, to enable use of the projector system in handheld devices or small appliances. It is also desirable to increase the brightness of the projector system, which requires reducing the etendue of the illumination source in the projector system. Achieving simultaneous size reduction and brightness increase in projector systems with single imaging arrays has been problematic.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to a more detailed description that is presented later.

A projector system with a single imaging array has a low-etendue light source. The projector system includes a first optical path from the low-etendue light source to a plurality of optical conversion media having a plurality of emission wavelengths in the visible range, and a second optical path from the optical conversion media to the imaging array. The projector system has a means of moving an excitation location on the optical conversion media in the first optical path. Light from the low-etendue light source is prevented from directly impinging on the imaging array.

DETAILED DESCRIPTION OF EXAMPLE EMBODIMENTS

Figure 1:
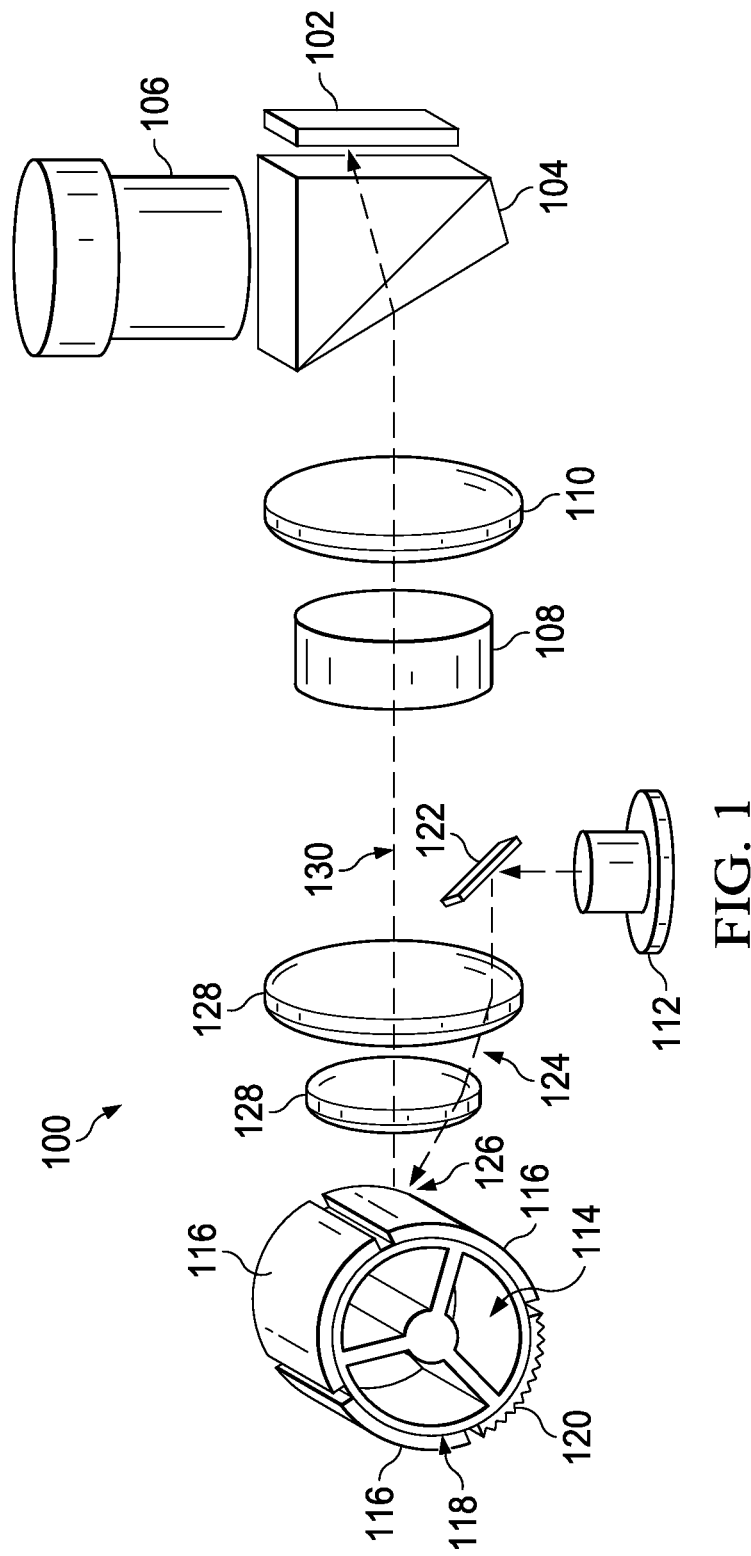
FIG. 1 depicts an example projector system.

The present invention is described with reference to the attached figures. The figures are not drawn to scale and they are provided merely to illustrate the invention. Several aspects of the invention are described below with reference to example applications for illustration. It should be understood that numerous specific details, relationships, and methods are set forth to provide an understanding of the invention. One skilled in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The term low-etendue light source refers herein to a light source with an etendue less than 10 millimeters squared—steradians. The term speckle refers herein to an intensity pattern produced by mutual interference of a set of light wavefronts. Speckle may be disadvantageously noticeable in laser light. The term optical path refers herein to a path in a projector system that light would travel along, transmitted and/or reflected, as appropriate, by optical elements in the optical path. The optical path may be determined by light sources at an end of the optical path, and by lenses, mirrors and/or other optical elements in the optical path.

A projector system has a single imaging array. The projector system includes a low-etendue light source. The low-etendue light source may be a laser. A first optical path of the projector system extends from the low-etendue light source to a plurality of optical conversion media. The plurality of optical conversion media have a plurality of emission wavelengths in the visible range. The optical conversion media may include phosphors and/or quantum dots. A second optical path of the projector system extends from the optical conversion media to the imaging array. In some versions of the projector system, the optical conversion media may be in a reflective configuration, that is, pump light from the low-etendue light source enters the optical conversion media on one face and display light from the optical conversion media is emitted from the same face. In other versions of the projector system, the optical conversion media may be in a transmissive configuration, that is, pump light from the low-etendue light source enters the optical conversion media on a first face and display light from the optical conversion media is emitted from a second, opposite, face.

The projector system has a means of moving a location on the optical conversion media in the first optical path. In some versions of the projector system, the means may include a moving mirror or a beam steering device in the first optical path. In other versions of the projector system, the means may include a means of moving the plurality of optical conversion media.

During operation of the projector system, pump light from the low-etendue light source travels through the first optical path to excite a portion of the optical conversion media, the portion being at the location where the first optical path intersects the optical conversion media. The low etendue of the light source advantageously provides efficient conversion of the pump light into the display light and coupling of the display light into the imaging array. Display light is emitted from the excited portion of the optical conversion media and travels through the second optical path to the imaging array. The means of moving the location on the optical conversion media in the first optical path results in each of the optical conversion media being excited by the pump light at different times, and thus the display light includes different wavelength bands at the different times.

In some versions of the projector system in which the low-etendue light source is a blue laser with a center wavelength between 435 nanometers and 470 nanometers, a diffuser region may be located in an optical path extending to the low-etendue light source, with another optical path extending from the diffuser region to the imaging array. During operation of the projector system, pump light traveling through the optical path and impinging on the diffuser region produces a blue display light with reduced speckle that travels through the another optical path to the imaging array.

In other versions of the projector system in which the low-etendue light source is a blue laser with a center wavelength between 435 nanometers and 470 nanometers, a blue light emitting diode (LED) may be disposed in an optical path which extends to the imaging array. During operation of the projector system, the blue LED provides blue display light through the optical path to the imaging array which is substantially free of speckle.

In still further versions of the projector system, in which the low-etendue light source is a deep blue laser with a center wavelength from 400 nanometers to 435 nanometers, one of the optical conversion media may include blue phosphors and/or blue quantum dots with emission wavelengths between 435 nanometers and 470 nanometers. During operation of the projector system, the pump light excites the blue phosphors and/or blue quantum dots which emit blue display light, which is substantially free of speckle, that travels through the second optical path to the imaging array.

Alternatively, the low-etendue light source may be an infrared laser and the optical conversion media may include up-conversion phosphors to provide display light of colors in the visible spectrum. The infrared laser may provide pump light with an advantageous high efficiency at a wavelength between 750 nanometers to 900 nanometers.

FIG. 1 depicts an example projector system. The projector system 100 includes exactly one imaging array 102, which may be, for example, a DMD device or an LCOS array. The projector system 100 may include an array coupling element 104 such as a prism 104 as shown in FIG. 1. A projector lens 106 is located downstream from the array coupling element 104 so that patterned display light from the imaging array 102 passes through the projector lens 106. The projector system 100 also includes an integrator 108 such as a fly's eye 108 as depicted in FIG. 1 or a prism integrator. The integrator 108 is upstream of the array coupling element 104. The projector system 100 may optionally include a focusing element 110 such as a lens 110 between the integrator 108 and the array coupling element 104.

In the instant example, the projector system 100 includes a low-etendue light source 112, referred to herein as the light source 112, such as a blue laser 112 having a center wavelength between 435 nanometers and 470 nanometers. The projector system 100 includes a rotatable drum 114 with a plurality of optical conversion media 116 disposed on a reflective outer surface 118 of the rotatable drum 114. The optical conversion media 116 may include, for example, phosphors or quantum dots. One optical conversion medium 116 may have a red emission wavelength, another optical conversion medium 116 may have a green emission wavelength, and another optical conversion medium 116 may have a yellow emission wavelength. A diffuser region 120 is also disposed on the outer surface 118 of the rotatable drum 114.

A source mirror 122 may be disposed in a first optical path 124 which extends from the light source 112 to an excitation location 126 on the optical conversion media 116 on the rotatable drum 114. Collimator lenses 128 may be disposed between the rotatable drum 114 and the integrator 108, in a second optical path 130 which extends from the excitation location 126 on the optical conversion media 116 through the collimator lenses 128, the integrator 108, the focusing element 110 if present, and the array coupling element 104 to the imaging array 102. In the instant example, the first optical path 124 is angularly separated from the second optical path 130 so that the second optical path 130 advantageously is not significantly occluded by elements such as the source mirror 122 or the light source 112. The reflective configuration of the optical conversion media 116 and the off-axis configuration of the first optical path 124 with respect to the second optical path 130 may provide a smaller size for the projector system 100, advantageously enabling a broader range of applications.

During operation of the projector system 100, the light source 112 provides blue pump light through the first optical path 124 to the excitation location 126. The rotatable drum 114 is rotated so that the excitation location 126 sequentially traverses the plurality of optical conversion media 116 and the diffuser region 120. Moving the excitation location 126 on the optical conversion media 116 may advantageously reduce heating of the optical conversion media 116 at the excitation location 126. Display light is emitted from the excitation location 126 through the second optical path 130 to the imaging array 102. When the excitation location 126 is located on one of the optical conversion media 116, the display light has a wavelength corresponding to an emission wavelength of that optical conversion media 116. When the excitation location 126 is located on the diffuser region 120, the display light has the same wavelength band as the pump light. The light source 112 may be turned on and off as needed and rotation of the rotatable drum 114 may be varied as needed to provide a desired mix of colors in the display light. The display light from the optical conversion media 116 is advantageously free of speckle, and the display light from the diffuser region 120 advantageously exhibits reduced speckle. The diffuser region 120 advantageously prevents the pump light from the light source 112 from directly impinging on the imaging array 102.

In another version of the instant example, the optical conversion media 116 and the diffuser region 120 may be disposed on a rotatable reflective wheel instead of the rotatable drum 114. In a further version, the diffuser region 120 may be a stationary region behind a transparent segment on the rotatable drum 114 where FIG. 1 depicts the diffuser region 120. This may advantageously reduce imbalance in the rotatable drum 114. In an alternate version of the instant example, the light source 112 may be a deep blue laser, and the diffuser region 120 may be replaced with an optical conversion medium 116 having a blue emission wavelength.

Figure 2:
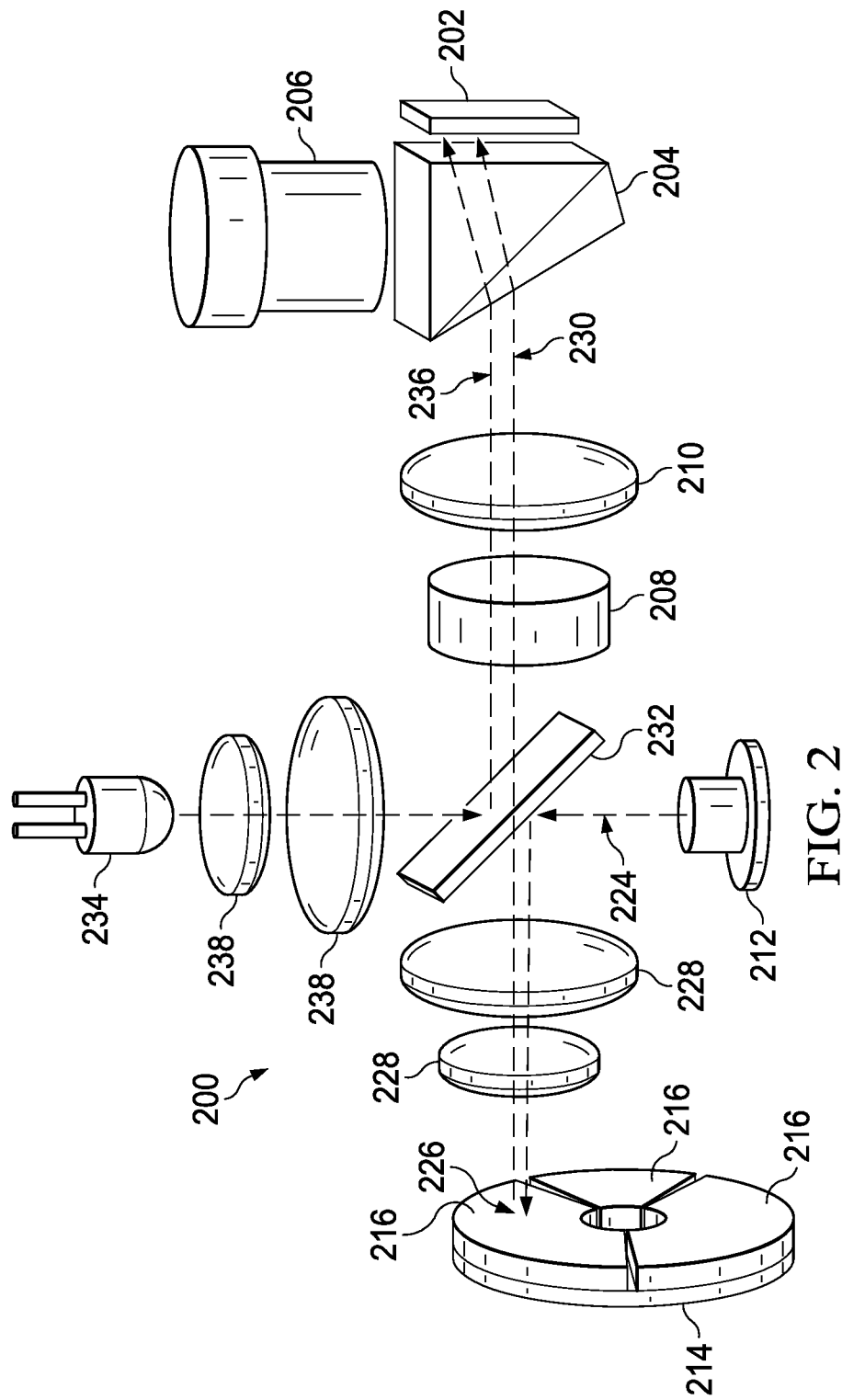
FIG. 2 depicts another example projector system.

FIG. 2 depicts another example projector system. The projector system 200 includes exactly one imaging array 202, a projector lens 206 and an integrator 208, as described in reference to FIG. 1. The projector system 200 may include an array coupling element 204 and a focusing element 210 between the integrator 208 and the array coupling element 204.

In the instant example, the projector system 200 includes a low-etendue light source 212, referred to herein as the light source 212, such as a blue laser 212 having a center wavelength between 435 nanometers and 470 nanometers. The projector system 200 includes a rotatable wheel 214 with a plurality of optical conversion media 216 disposed on the rotatable wheel 214. The optical conversion media 216 may include, for example, phosphors or quantum dots, with one optical conversion medium 216 having a red emission wavelength, another optical conversion medium 216 having a green emission wavelength, and another optical conversion medium 216 having a yellow emission wavelength, as described in reference to FIG. 1.

A dichroic mirror 232 is disposed in a first optical path 224 which extends from the light source 212 to an excitation location 226 on the optical conversion media 216 on the rotatable wheel 214. The dichroic mirror 232 reflects blue light from the light source 212 and transmits light with longer wavelengths than blue light, for example, green, yellow and red light from the optical conversion media 216. The dichroic mirror 232 is positioned to reflect blue pump light from the light source 212 to the excitation location 226. A second optical path 230 extends from the excitation location 226 on the optical conversion media 216 through the dichroic mirror 232, the integrator 208, the focusing element 210 if present, and the array coupling element 204 to the imaging array 202. Collimator lenses 228 may be disposed between the rotatable wheel 214 and the dichroic mirror 232, in the first optical path 224 and the second optical path 230.

The projector system 200 includes a blue LED 234 disposed opposite from the light source 212 so that blue light from the blue LED 234 is reflected by the dichroic mirror 232 into the integrator 208 along a third optical path 236 to the imaging array 202. Collimator lenses 238 may be disposed in the third optical path 236 between the blue LED 234 and the dichroic mirror 232.

During operation of the projector system 200, the light source 212 provides blue pump light through the first optical path 224, reflected by the dichroic mirror 232 to the excitation location 226. The rotatable wheel 214 is rotated so that the excitation location 226 sequentially traverses the plurality of optical conversion media 216. Moving the excitation location 226 on the optical conversion media 216 may advantageously reduce heating of the optical conversion media 216 at the excitation location 226. Display light is emitted from the excitation location 226 into the second optical path 230, is transmitted through the dichroic mirror 232 and through the integrator 208, to the imaging array 202. Pump light from the light source 212 which is reflected from the optical conversion media 216 is advantageously reflected by the dichroic mirror 232 and thus removed from the display light, advantageously prevented from impinging directly on the imaging array 202 and providing more saturated colors in the display light. Blue display light is emitted by the blue LED 234 into the third optical path 236, is reflected by the dichroic mirror 232 into the integrator 208, to the imaging array 202. The light source 212 and the blue LED 234 may be turned on and off as needed to provide a desired mix of colors in the display light. The display light from the optical conversion media 216 and the blue LED 234 is advantageously free of speckle. In another version of the instant example, the optical conversion media 216 may be disposed on a rotatable reflective drum instead of the rotatable wheel 214.

Figure 3:
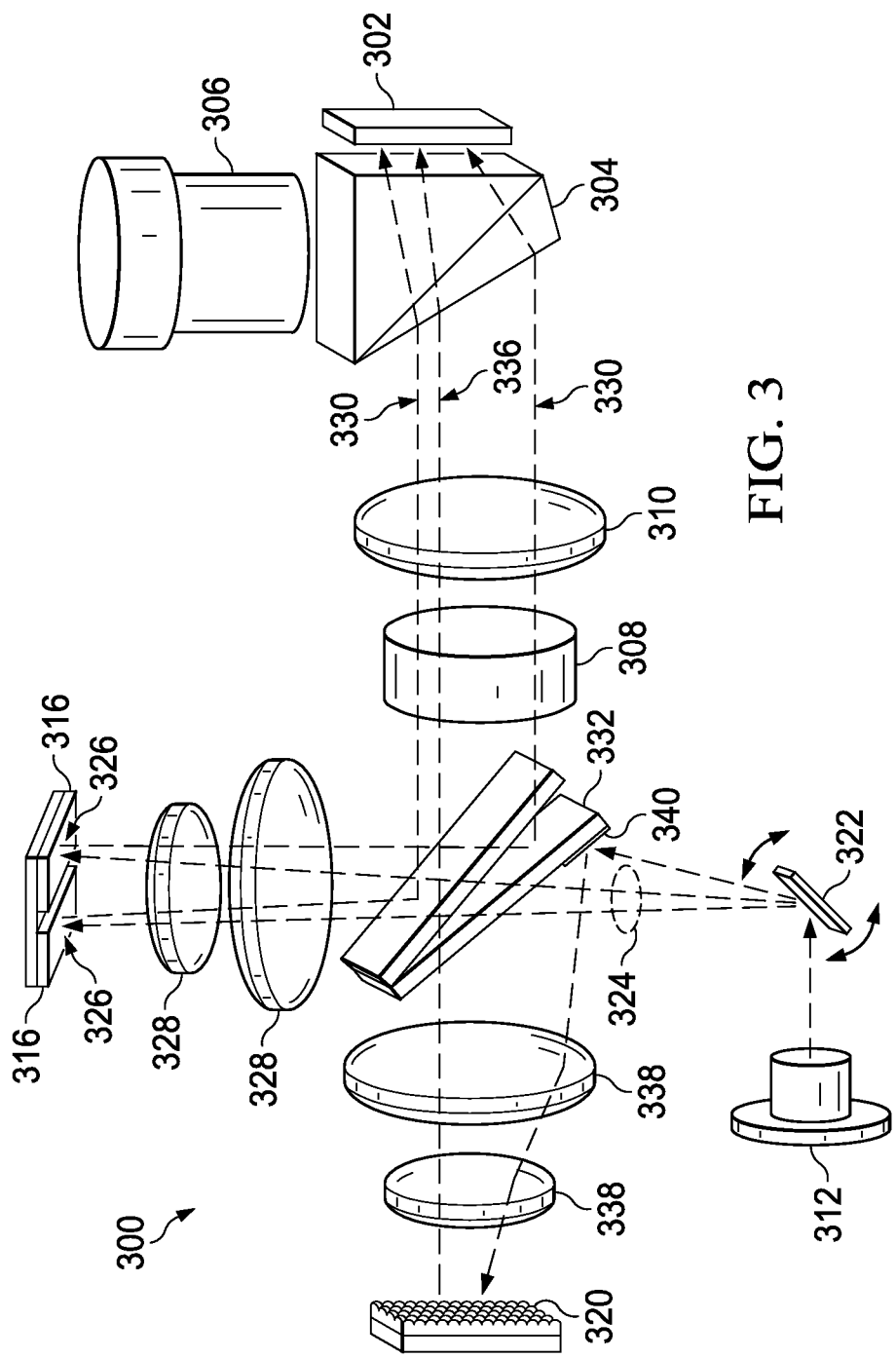
FIG. 3 depicts yet another example projector system.

FIG. 3 depicts yet another example projector system. The projector system 300 includes exactly one imaging array 302, a projector lens 306 and an integrator 308, as described in reference to FIG. 1. The projector system 300 may include an array coupling element 304 and a focusing element 310 between the integrator 308 and the array coupling element 304, also as described in reference to FIG. 1.

In the instant example, the projector system 300 includes a low-etendue light source 312, referred to herein as the light source 312, such as a blue laser 312 having a center wavelength between 435 nanometers and 470 nanometers. The projector system 300 includes a fixed array of a plurality of optical conversion media 316 in a reflective configuration. The optical conversion media 316 may include, for example, phosphors or quantum dots, with one optical conversion medium 316 having a red emission wavelength, another optical conversion medium 316 having a green emission wavelength, and another optical conversion medium 316 having a yellow emission wavelength, as described in reference to FIG. 1. A deflectable source mirror 322 is disposed in a first optical path 324 which extends from the light source 312 to an excitation location 326 on the optical conversion media 316. During operation of the projector system 300, the deflectable source mirror 322 deflects so as to reflect blue pump light from the light source by different angles and thus move the excitation location 326 from one optical conversion medium 316 to another optical conversion medium 316, as depicted in FIG. 3. The deflectable source mirror 322 may deflect in a continuous manner so as to continuously vary a location of the excitation location 326, or may deflect in a discrete, stepwise manner. A fan dichroic mirror 332 is disposed in the first optical path 324 between the deflectable source mirror 322 and the optical conversion media 316. The fan dichroic mirror 332 may have a plurality of plates as depicted in FIG. 3 or may have a wedge configuration. The fan dichroic mirror 332 has a separate reflective surface for each optical conversion medium 316. The fan dichroic mirror 332 transmits blue light, in the instant example, the blue pump light from the light source 312, and reflects light with longer wavelengths, in the instant example, display light from the optical conversion media 316, along a second optical path 330 which extends from the excitation location 326 to the imaging array 302. The fan dichroic mirror 332 reflects different colors of the display light at different angles so as to reflect all the colors into the imaging array 302. Collimator lenses 328 may be disposed between the optical conversion media 316 and the fan dichroic mirror 332, in the first optical path 324 and the second optical path 330.

The projector system 300 includes a diffuser region 320 facing the fan dichroic mirror 332, opposite from the integrator 308. The fan dichroic mirror 332 includes a blue reflective segment 340. During operation of the projector system 300, the deflectable source mirror 322 deflects to a certain angle so as to reflect the blue pump to the blue reflective segment 340 which reflects the blue pump light to the diffuser region 320. Blue display light is reflected from the diffuser region 320 into a third optical path 336 which extends from the diffuser region 320 through the fan dichroic mirror 332 and through the integrator 308 to the imaging array 302. The blue reflective segment 340 is disposed so that the blue pump light into the diffuser region 320 is angularly separated from the blue display light from the diffuser region 320 so that the blue display light is advantageously collected with high efficiency by the integrator 308. Collimator lenses 338 may be disposed in the third optical path 336 between the diffuser region 320 and the fan dichroic mirror 332.

During operation of the projector system 300, the light source 312 provides blue pump light through the first optical path 324, transmitted through the fan dichroic mirror 332 to the excitation location 326. The deflectable source mirror 322 is deflected so that the excitation location 326 moves from one of the plurality of optical conversion media 316 to another. Moving the excitation location 326 on the optical conversion media 316 may advantageously reduce heating of the optical conversion media 316 at the excitation location 326. Display light is emitted from the excitation location 326 into the second optical path 330, is reflected by the fan dichroic mirror 332 and through the integrator 308, to the imaging array 302. Pump light from the light source 312 which is reflected from the optical conversion media 316 is advantageously transmitted through the fan dichroic mirror 332 and thus removed from the display light, providing more saturated colors in the display light. Blue display light is reflected by the diffuser region 320 into the third optical path 336, is transmitted by the fan dichroic mirror 332 into the integrator 308, to the imaging array 302. The diffuser region 320 advantageously prevents the pump light from the light source 312 from directly impinging on the imaging array 302. The light source 312 may be turned on and off as needed, and the deflectable source mirror 322 may be deflected to different angles as needed, to provide a desired mix of colors in the display light. The display light from the optical conversion media 316 is advantageously free of speckle, and the blue display light from the diffuser region 320 advantageously exhibits reduced speckle. In another version of the instant example, the diffuser region 320 may be replaced with a blue LED.

Figure 4:
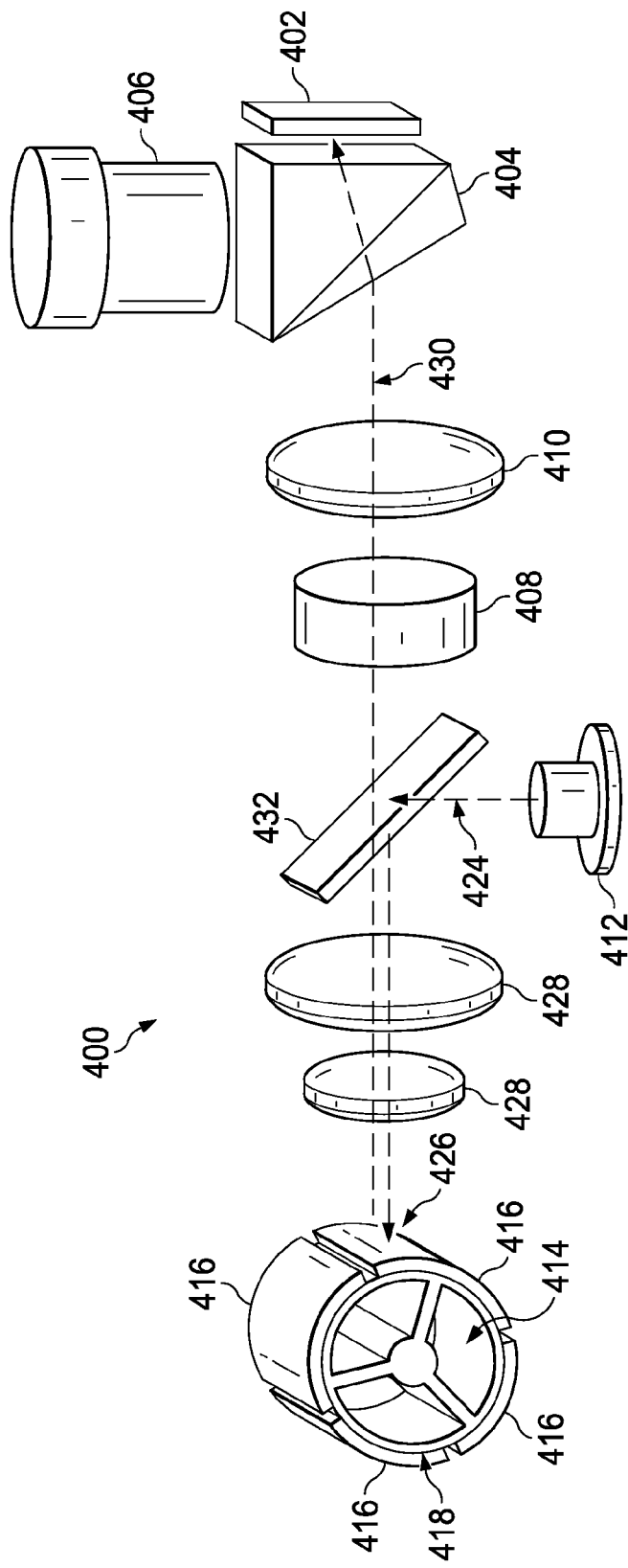
FIG. 4 depicts a further example projector system.

FIG. 4 depicts a further example projector system. The projector system 400 includes exactly one imaging array 402, a projector lens 406 and an integrator 408, as described in reference to FIG. 1. The projector system 400 may include an array coupling element 404 and a focusing element 410 between the integrator 408 and the array coupling element 404, also as described in reference to FIG. 1.

In the instant example, the projector system 400 includes a low-etendue light source 412, referred to herein as the light source 412, such as a deep blue laser 412 having a center wavelength between 400 nanometers and 435 nanometers. The projector system 400 includes a rotatable drum 414 with a plurality of optical conversion media 416 disposed on the rotatable wheel 414. The optical conversion media 416 may include, for example, phosphors or quantum dots, with one optical conversion medium 416 having a red emission wavelength, another optical conversion medium 416 having a green emission wavelength, and another optical conversion medium 416 having a yellow emission wavelength, as described in reference to FIG. 1, and a further optical conversion medium 416 having a blue emission wavelength. A dichroic mirror 432 is disposed in a first optical path 424 which extends from the light source 412 to an excitation location 426 on the optical conversion media 416 on the rotatable drum 414. The dichroic mirror 432 reflects deep blue light and transmits light with longer wavelengths than deep blue light, for example, blue, green, yellow and red light from the optical conversion media 416. The dichroic mirror 432 is positioned to reflect deep blue pump light from the light source 412 to the excitation location 426. A second optical path 430 extends from the excitation location 426 on the optical conversion media 416 through the dichroic mirror 432, the integrator 408, the focusing element 410, and the array coupling element 404 to the imaging array 402. Collimator lenses 428 may be disposed between the rotatable drum 414 and the dichroic mirror 432, in the first optical path 424 and the second optical path 430.

During operation of the projector system 400, the light source 412 provides deep blue pump light through the first optical path 424, reflected by the dichroic mirror 432 to the excitation location 426. The rotatable drum 414 is rotated so that the excitation location 426 sequentially traverses the plurality of optical conversion media 416. Moving the excitation location 426 on the optical conversion media 416 may advantageously reduce heating of the optical conversion media 416 at the excitation location 426. Display light is emitted from the excitation location 426 into the second optical path 430, is transmitted through the dichroic mirror 432 and through the integrator 408, to the imaging array 402. Pump light from the light source 412 which is reflected from the optical conversion media 416 is advantageously reflected by the dichroic mirror 432 and thus removed from the display light, preventing the pump light from directly impinging on the imaging array 402 and providing more saturated colors in the display light. In the instant example, all colors of the display light are provided by the optical conversion media 416 excited by the pump light from the light source 412, advantageously reducing complexity and size of the projector system 400. The light source 412 may be turned on and off as needed and the rotation of the rotatable drum 414 may be varied as needed to provide a desired mix of colors in the display light. The display light from the optical conversion media 416 is advantageously free of speckle. In another version of the instant example, the optical conversion media 416 may be disposed on a rotatable reflective wheel instead of the rotatable drum 414.

Figure 5:
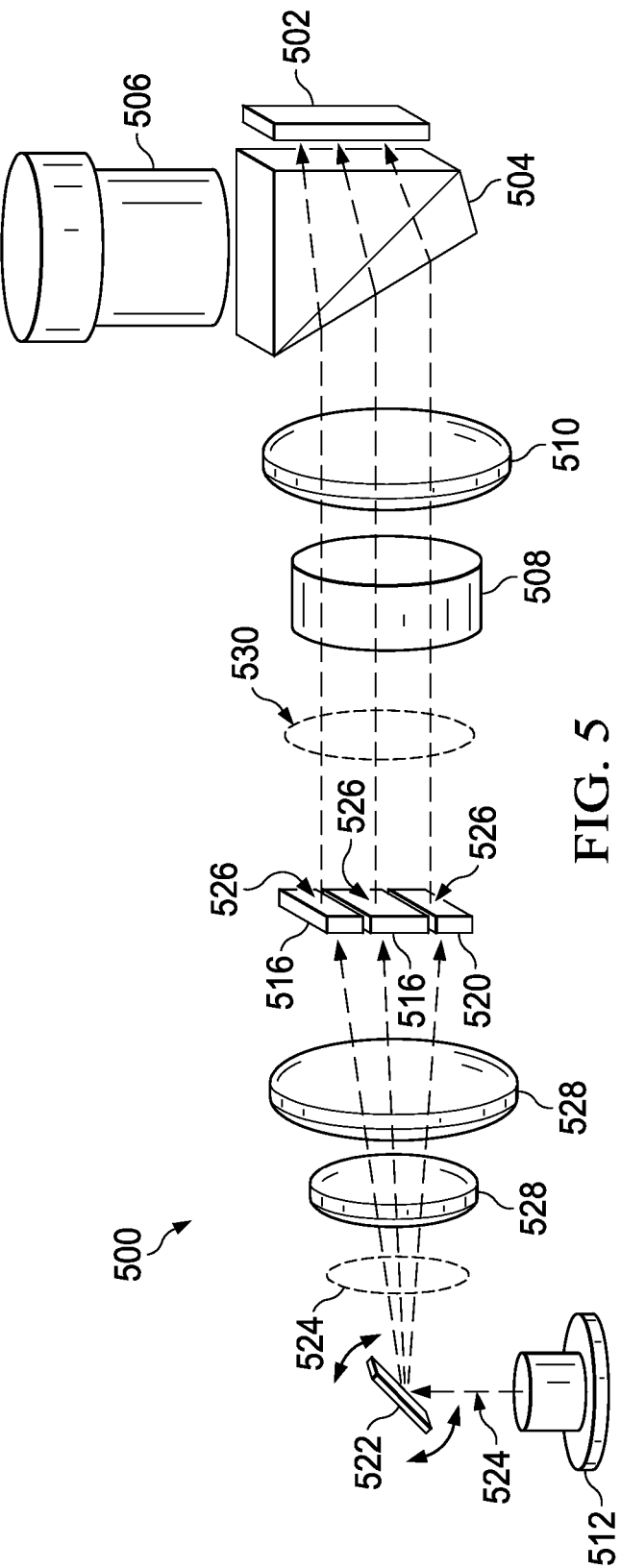
FIG. 5 depicts another example projector system.

FIG. 5 depicts another example projector system. The projector system 500 includes exactly one imaging array 502, a projector lens 506 and an integrator 508, as described in reference to FIG. 1. The projector system 500 may include an array coupling element 504 and a focusing element 510 between the integrator 508 and the array coupling element 504, also as described in reference to FIG. 1.

In the instant example, the projector system 500 includes a low-etendue light source 512, referred to herein as the light source 512, such as a laser having a center wavelength less than 470 nanometers. The projector system 500 includes a fixed array of a plurality of optical conversion media 516 in a transmissive configuration. The optical conversion media 516 may include, for example, phosphors or quantum dots, with one optical conversion medium 516 having a red emission wavelength, and another optical conversion medium 516 having a green emission wavelength. A deflectable source mirror 522 is disposed in a first optical path 524 which extends from the light source 512 to an excitation location 526 on the optical conversion media 516. During operation of the projector system 500, the deflectable source mirror 522 deflects so as to reflect blue pump light from the light source by different angles and thus move the excitation location 526 from one optical conversion medium 516 to another optical conversion medium 516, as depicted in FIG. 5. Collimator lenses 528 may be disposed between the deflectable source mirror 522 and the plurality of optical conversion media 516, in the first optical path 524. A second optical path 530 extends from the excitation location 526 on the optical conversion media 516 through the integrator 508, the focusing element 510, and the array coupling element 504 to the imaging array 502.

In one version of the instant example, the light source 512 may be a deep blue laser 512 having a center wavelength between 400 nanometers and 435 nanometers. One of the optical conversion media 516 may a blue emission wavelength, so that blue display light is provided from the optical conversion media 516 with the blue emission wavelength when excited by the deep blue laser 512.

In another version of the instant example, the light source 512 may be a blue laser 512 having a center wavelength between 435 nanometers and 470 nanometers. A diffuser region 520 may be disposed with the plurality of optical conversion media 516, so that blue display light is provided from the diffuser region 520 when illuminated by the blue laser 512.

During operation of the projector system 500, the light source 512 provides pump light through the first optical path 524, reflected by the deflectable source mirror 522 to the excitation location 526. The deflectable source mirror 522 is deflected so that the excitation location 526 moves among the plurality of optical conversion media 516 and the diffuser region 520 if present. Moving the excitation location 526 on the optical conversion media 516 may advantageously reduce heating of the optical conversion media 516 at the excitation location 526. Display light is emitted from the excitation location 526 into the second optical path 530, is transmitted through the integrator 508, to the imaging array 502. In the instant example, all colors of the display light are provided by the optical conversion media 516, possibly including the diffuser region 520 located with the optical conversion media 516, illuminated by the pump light from the light source 512, advantageously reducing complexity and size of the projector system 500. The optical conversion media 516 and the diffuser region 520 if present advantageously prevent the pump light from the light source 512 from directly impinging on the imaging array 502. The light source 512 may be turned on and off as needed and the deflection of the deflectable source mirror 522 may be varied as needed to provide a desired mix of colors in the display light. The display light from the optical conversion media 516 is advantageously free of speckle.

Figure 6:
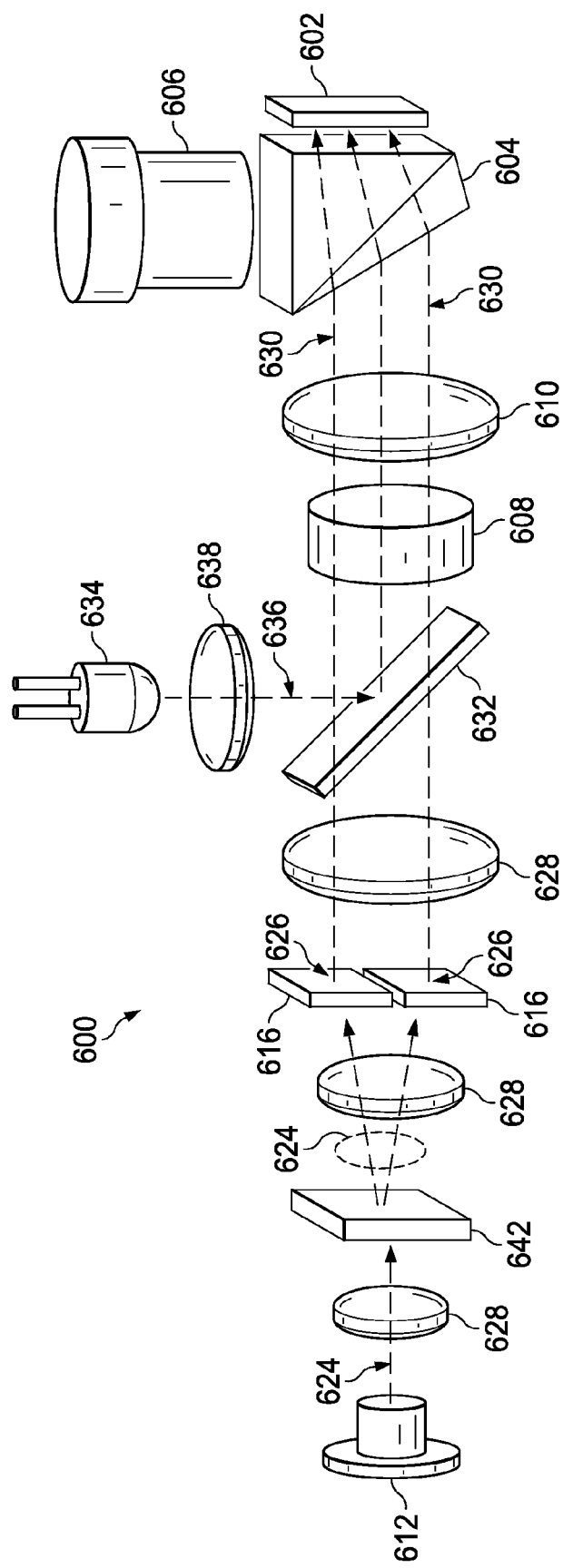
FIG. 6 depicts a further example projector system.

FIG. 6 depicts a further example projector system. The projector system 600 includes exactly one imaging array 602, a projector lens 606 and an integrator 608, as described in reference to FIG. 1. The projector system 600 may include an array coupling element 604 and a focusing element 610 between the integrator 608 and the array coupling element 604, also as described in reference to FIG. 1.

In the instant example, the projector system 600 includes a low-etendue light source 612, referred to herein as the light source 612, such as a blue laser 612 having a center wavelength between 435 nanometers and 470 nanometers. The projector system 600 includes a fixed array of two optical conversion media 616 in a transmissive configuration. The optical conversion media 616 may include, for example, phosphors or quantum dots, with one optical conversion medium 616 having a red emission wavelength, and another optical conversion medium 616 having a green emission wavelength. A switchable Bragg grating 642 is disposed in a first optical path 624 which extends from the light source 612 to the optical conversion media 616. One or two collimator lenses 628 may be disposed in the first optical path 624, between the light source 612 and the switchable Bragg grating 642, and/or between the switchable Bragg grating 642 and the optical conversion media 616. During operation of the projector system 600, the switchable Bragg grating 642 alternately transmits pump light from the light source 612 along two branches of the first optical path 624; a first branch of the first optical path 624 intercepts a first optical conversion medium 616 and a second branch of the first optical path 624 intercepts a second optical conversion medium 616, as depicted in FIG. 6. The switchable Bragg grating 642 is controlled by an electrical signal.

A dichroic mirror 632 is disposed in a second optical path 630 which extends from the excitation location 626 on the optical conversion media 616 through the dichroic mirror 632, the integrator 608, the focusing element 610 if present, and the array coupling element 604 to the imaging array 602. The dichroic mirror 632 reflects blue light out of the second optical path 630 and transmits light with longer wavelengths than blue light, for example, green and red light from the optical conversion media 616, into the second optical path 630. Another collimator lens 628 may be disposed in the second optical path 630 between the optical conversion media 616 and the dichroic mirror 632.

The projector system 600 includes a blue LED 634 disposed facing from the dichroic mirror 632 so that blue light from the blue LED 634 is reflected by the dichroic mirror 632 into the integrator 608 along a third optical path 636 to the imaging array 602. Collimator lenses 638 may be disposed in the third optical path 636 between the blue LED 634 and the dichroic mirror 632.

During operation of the projector system 600, the light source 612 provides blue pump light through the first optical path 624, steered by the switchable Bragg grating 642 to the excitation locations 626. The switchable Bragg grating 642 is switched so that the excitation location 626 alternates on the two optical conversion media 616. Display light is emitted from the excitation location 626 into the second optical path 630, is transmitted through the dichroic mirror 632 and through the integrator 608, to the imaging array 602. Pump light from the light source 612 which is transmitted through the optical conversion media 616 is advantageously reflected by the dichroic mirror 632 and thus removed from the display light, providing more saturated colors in the display light. Blue display light is emitted by the blue LED 634 into the third optical path 636, is reflected by the dichroic mirror 632 into the integrator 608, to the imaging array 602. The light source 612 and the blue LED 634 may be turned on and off as needed to provide a desired mix of colors in the display light. The display light from the optical conversion media 616 and the blue LED 634 is advantageously free of speckle. The projector system 600 has no mechanical moving parts which may advantageously increase a reliability of the projector system 600.

In an alternate version of the instant example, the projector system 600 may include a second switchable Bragg grating located behind the switchable Bragg grating 642 so as to provide three branches of the second optical path 630, and the plurality of optical conversion media 616 may include a third optical conversion medium 616 with a blue emission wavelength, thus eliminating the need for the blue LED 634. Elimination of the blue LED 634 may advantageously reduce a size of the projector system 600.

While various embodiments of the present invention have been described above, it should be understood that they have been presented by way of example only and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A projector system, comprising:
  exactly one imaging array;
  a low-etendue light source having an etendue less than 10 millimeters squared—steradians with a center wavelength less than 470 nanometers;
  a rotatable structure having a plurality of optical conversion media in a reflective configuration, the optical conversion media having emission wavelengths longer than the wavelength of the low-etendue light source;
  a first optical path which extends from the low-etendue light source to the optical conversion media; and a second optical path which extends from the optical conversion media to the imaging array;

wherein the first optical path is angularly separated from the second optical path at the plurality of optical conversion media.

2. The projector system of claim 1, wherein:
the low-etendue light source is a laser with a wavelength between 435 nanometers and 470 nanometers; and
the projector system includes a diffuser region in a reflective configuration, the diffuser region being disposed in a third optical path which extends from the light source to the diffuser region and in a fourth optical path which extends from the diffuser region to the imaging array.

3. The projector system of claim 1, wherein:
the low-etendue light source is a laser with a center wavelength between 435 nanometers and 470 nanometers; and
the projector system includes a blue light emitting diode (LED) disposed in a third optical path which extends from the blue LED to the imaging array.

4. The projector system of claim 1, wherein:
the low-etendue light source is a laser with a center wavelength between 400 nanometers and 435 nanometers; and
the plurality of optical conversion media includes an optical conversion medium with a blue emission wavelength.

5. The projector system of claim 1, wherein the rotatable structure is a rotatable drum.

6. The projector system of claim 1, wherein the rotatable structure is a rotatable wheel.

7. The projector system of claim 1, comprising a dichroic mirror disposed in the first optical path and the second optical path.

8. A projector system, comprising:
exactly one imaging array;
a low-etendue light source having an etendue less than 10 millimeters squared—steradians with a center wavelength less than 470 nanometers;
a plurality of optical conversion media in a reflective configuration, the optical conversion media having emission wavelengths longer than the wavelength of the low-etendue light source;
a first optical path which extends from the low-etendue light source to the optical conversion media;
a second optical path which extends from the optical conversion media to the imaging array; and
a structure for steering light from the low-etendue light source with respect to the plurality of optical conversion media on the first optical path;
wherein the structure for steering the light from the low-etendue light source includes a deflectable mirror.

9. The projector system of claim 8, wherein:
the low-etendue light source is a laser with a center wavelength between 435 nanometers and 470 nanometers.

10. The projector system of claim 9, wherein:
the projector system includes a diffuser region in a reflective configuration, the diffuser region being disposed in a third optical path which extends from the light source to the diffuser region and in a fourth optical path which extends from the diffuser region to the imaging array.

11. The projector system of claim 8, wherein:
the low-etendue light source is a laser with a center wavelength between 400 nanometers and 435 nanometers.

12. A projector system, comprising:
exactly one imaging array;
a low-etendue light source having an etendue less than 10 millimeters squared—steradians with a center wavelength less than 470 nanometers;
a plurality of optical conversion media in a reflective configuration, the optical conversion media having emission wavelengths longer than the wavelength of the low-etendue light source;
a first optical path which extends from the low-etendue light source to the optical conversion media;
a second optical path which extends from the optical conversion media to the imaging array;
a structure for steering light from the low-etendue light source with respect to the plurality of optical conversion media on the first optical path; and
a fan dichroic mirror disposed in the first optical path and the second optical path.

13. The projector system of claim 12, wherein:
the low-etendue light source is a laser with a center wavelength between 435 nanometers and 470 nanometers.

14. The projector system of claim 13, wherein:
the projector system includes a diffuser region in a reflective configuration, the diffuser region being disposed in a third optical path which extends from the light source to the diffuser region and in a fourth optical path which extends from the diffuser region to the imaging array.

15. The projector system of claim 12, wherein:
the low-etendue light source is a laser with a center wavelength between 400 nanometers and 435 nanometers.

16. A projector system, comprising:
exactly one imaging array;
a low-etendue light source having an etendue less than 10 millimeters squared—steradians with a center wavelength less than 470 nanometers;
a plurality of optical conversion media in a transmissive configuration, the optical conversion media having emission wavelengths longer than the wavelength of the low-etendue light source;
a first optical path which extends from the low-etendue light source to the optical conversion media;
a second optical path which extends from the optical conversion media to the imaging array; and
a structure for steering light from the low-etendue light source with respect to the plurality of optical conversion media on the first optical path;
wherein the structure for steering the light from the low-etendue light source includes a deflectable mirror.

17. The projector system of claim 16, wherein:
the low-etendue light source is a laser with a center wavelength between 400 nanometers and 435 nanometers; and
the plurality of optical conversion media includes an optical conversion medium with a blue emission wavelength.

18. A projector system, comprising:
exactly one imaging array;
a low-etendue light source having an etendue less than 10 millimeters squared—steradians with a center wavelength less than 470 nanometers;
a plurality of optical conversion media in a transmissive configuration, the optical conversion media having emission wavelengths longer than the wavelength of the low-etendue light source;

a first optical path which extends from the low-etendue light source to the optical conversion media;

a second optical path which extends from the optical conversion media to the imaging array; and a structure for steering light from the low-etendue light source with respect to the plurality of optical conversion media on the first optical path;

wherein the structure for steering the light from the low-etendue light source includes a switchable Bragg grating.

19. The projector system of claim 18, wherein:

the low-etendue light source is a laser with a center wavelength between 435 nanometers and 470 nanometers; and the projector system includes a blue LED disposed in a third optical path which extends from the blue LED to the imaging array.

* * * * *